United States Patent
She

(10) Patent No.: US 8,253,786 B2
(45) Date of Patent: Aug. 28, 2012

(54) SITE MONITORING SYSTEMS AND METHODS

(75) Inventor: Ta-Lun She, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 376 days.

(21) Appl. No.: 12/570,041

(22) Filed: Sep. 30, 2009

(65) Prior Publication Data

US 2010/0271469 A1    Oct. 28, 2010

(30) Foreign Application Priority Data

Apr. 28, 2009    (CN) .......................... 2009 1 0301928

(51) Int. Cl.
- *H04N 9/47* (2006.01)
- *H04N 7/18* (2006.01)
- *G08B 23/00* (2006.01)
- *G06K 9/00* (2006.01)

(52) U.S. Cl. ............. 348/77; 348/78; 340/575; 382/115

(58) Field of Classification Search .................... 348/77, 348/78; 340/575; 382/115
See application file for complete search history.

(56) References Cited

U.S. PATENT DOCUMENTS

| | | | |
|---|---|---|---|
| 2002/0003571 A1* | 1/2002 | Schofield et al. | 348/148 |
| 2002/0159270 A1* | 10/2002 | Lynam et al. | 362/492 |
| 2005/0053262 A1* | 3/2005 | Szuba | 382/103 |
| 2007/0193811 A1* | 8/2007 | Breed et al. | 180/271 |
| 2008/0212746 A1 | 9/2008 | Gupta et al. | |

FOREIGN PATENT DOCUMENTS

CN    101375791 A    3/2009

* cited by examiner

*Primary Examiner* — Ranodhi Serrao
(74) *Attorney, Agent, or Firm* — Altis Law Group, Inc.

(57) ABSTRACT

A computer connected with an electronic device applicable for a sleeping baby in a crib sets a first threshold value and sets a second threshold value. The computer receives an acceleration value of the motion of the crib from the electronic device and activates the electronic device to capture an image if the acceleration value exceeds the first threshold value. The computer detects a face zone of a captured image and locates an eye area in the face zone then calculating a ratio of height and width of the eye area and compares the ratio to the second threshold value. The computer instructs the electronic device to dial a predefined warning number automatically if the ratio of height and width of the eye area exceeds the second threshold value.

16 Claims, 3 Drawing Sheets

SITE MONITORING SYSTEMS AND METHODS

BACKGROUND

1. Technical Field

Embodiments of the present disclosure generally relate to site monitoring, and more particularly to a system and method for site monitoring.

2. Description of Related Art

Several site monitoring systems have been developed, providing video and audio coverage of the site delivered by streaming or website. It may not be convenient to log on to a specific website to check the site status. Further, checking the status of the site by electronic device can be expensive.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions. One or more software instructions in the modules may be embedded in firmware. The modules described herein may be implemented as either software and/or hardware modules and may be stored in any type of computer-readable medium or other computer storage device.

Figure 1:
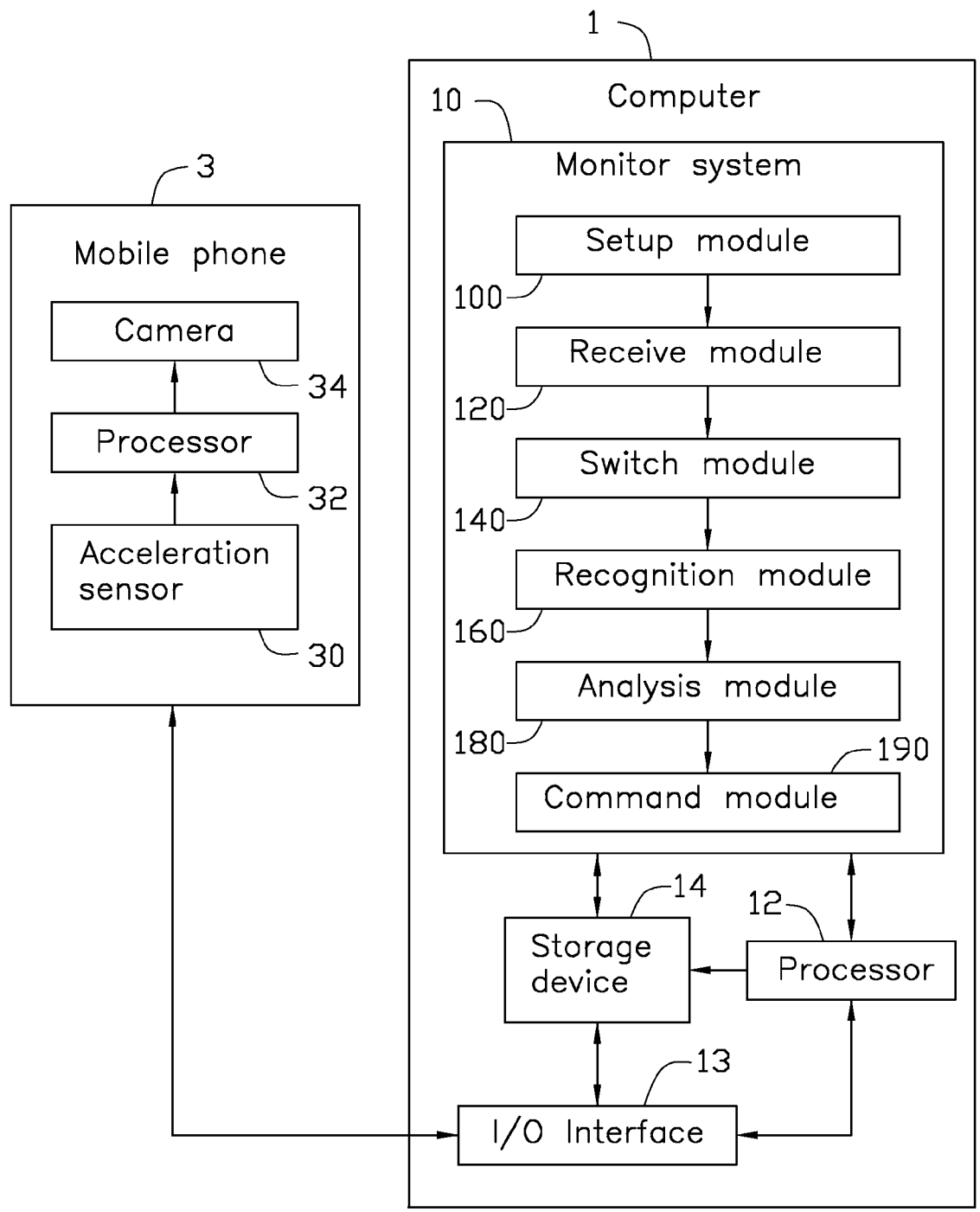
FIG. 1 is a block diagram of one embodiment of a site monitoring system.

FIG. 1 is a block diagram of one embodiment of a computer 1 comprising a site monitoring system 10. The site monitoring system 10 electronically communicates with a electronic device 3, to connect with a predetermined phone number to inform onsite personnel of the need for action based on transmitted coverage of site status. One example of a possible deployment of the system, while in way limiting the scope of the disclosure, would be to utilize the site monitoring system 10 to monitor a baby sleeping. In this example, the site monitoring system 10 may be used to transmit data to a defined user in the event of the baby waking up. In one example, the electronic device 3 may be a mobile phone.

The computer 1 includes at least a processor 12, an I/O interface 13 and a storage device 14. The I/O interface 13 provides communicability to the electronic device 3, via protocol such as, for example, Universal Serial Bus (USB). In one embodiment, the I/O interface 13 connects to other devices by a wireless communication protocol, such as Bluetooth, infrared, or the 3 G communication protocol.

Figure 2:
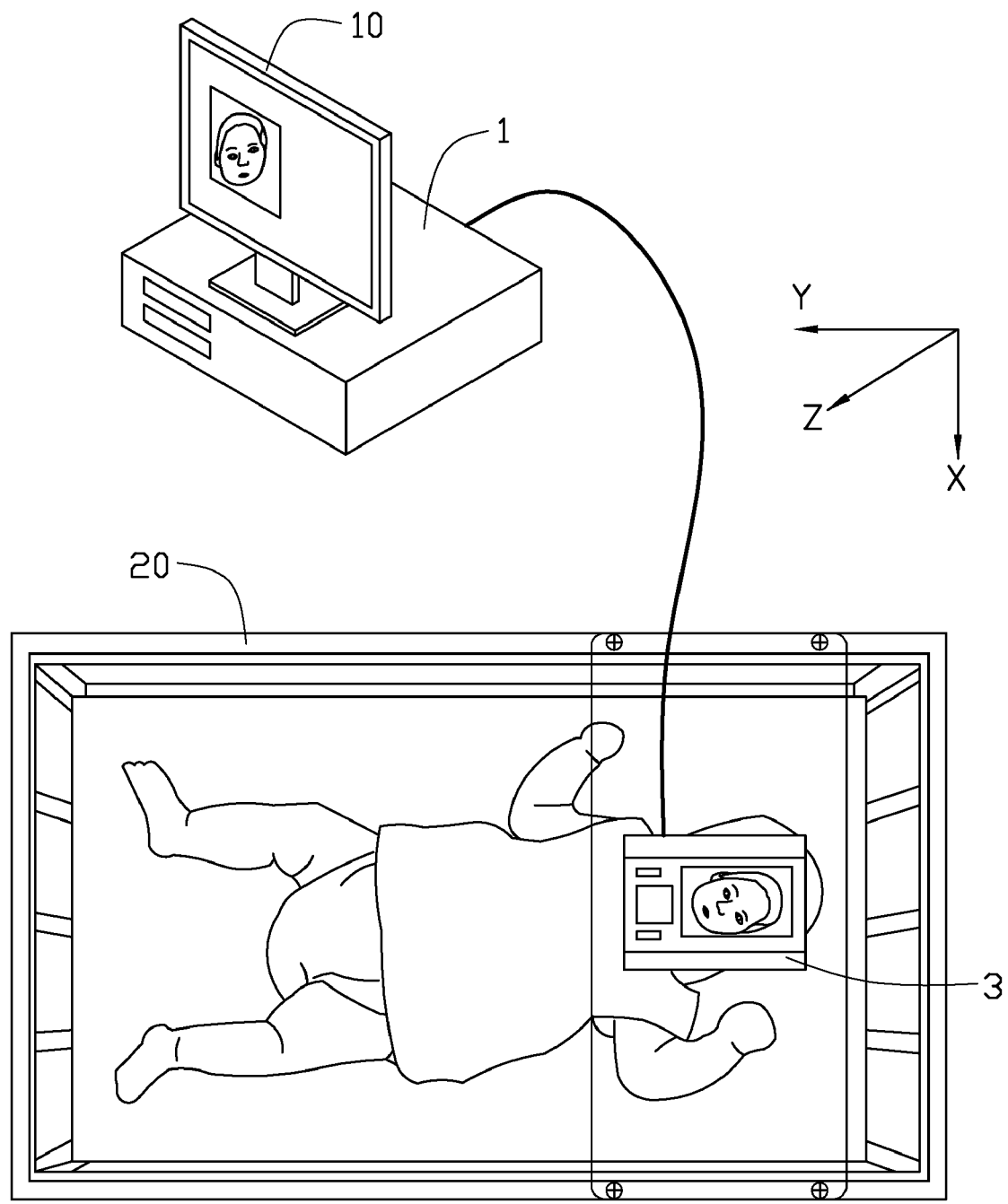
FIG. 2 is a schematic diagram of the site monitoring system of FIG. 1.

FIG. 2 shows one example of the site monitoring system 10 together with the computer 1 and the electronic device 3, deployed in an exemplary environment providing coverage of a crib 20, although the disclosure is in no way limited thereby. The computer 1 connects to the electronic device 3 placed in the crib 20 or positioned nearby the crib 20, so as to capture video data therefrom.

The electronic device 3 includes an acceleration sensor 30, a processor 32, and a camera 34. The acceleration sensor 30 is operable to measure acceleration value within a target region, such as the crib. In one embodiment, the acceleration sensor 30 may be a two-axis acceleration sensor to measure motion of the crib along the x and y axes. In other embodiments, the acceleration sensor may be a three-axis acceleration sensor measuring x, y, z acceleration values.

The processor 32 installed in the electronic device 3 is operable to execute one or more computerized instructions of the electronic device 3 and process computerized instructions from the computer 1. The camera 34 is included in the electronic device 3 and is operable to capture an image as will be further described below.

The site monitoring system 10 includes a setup module 100, a receiving module 120, a switch module 140, a recognition module 160, an analysis module 180 and a command module 190. The modules 100, 120, 140, 160, 180, 190 may include one or more computerized instructions that are executed by the processor 12.

The setup module 100 is operable to set a first threshold value to detect motion of the crib 20 and a second threshold value to check if the baby is awake. The setup module 100 further communicates with the acceleration sensor 30 to detect motion of the crib and sets a sensitivity level of the acceleration sensor 30, based on the specific qualities of the target region, in this case, the material and/or structure of the crib 20.

The receiving module 120 is operable to retrieve the acceleration value of the motion of the crib from the acceleration sensor 30 after the site monitoring system 10 is activated.

The switch module 140 is operable to compare the received acceleration value from the receiving module 120 with the first threshold value set by the setup module 100. The switch module 140 determines that the baby is awake if the received acceleration value exceeds the first threshold value. Upon determining that the baby is awake, the switch module 140 sends a switch instruction to the processor 32 of the electronic device 3 to instruct the camera 34 to capture an image of the baby in the crib 20. In addition, the captured image is then sent to the receiving module 120.

The recognition module 160 is operable to detect a face zone of the baby from the captured image received from the receiving module 120. Specifically, the detection of the face zone is accomplished by a skin-color algorithm. That is, the face zone is defined according to a range of skin colors of the baby's face. The range of the skin color is disclosed as the following equation:

$$Skin_{color}(x, y) = \begin{cases} 1, & \text{if } [Cr(x, y) \in Skin_{Cr}] \cap [Cb(x, y) \in Skin_{Cb}] \\ 0, & \text{otherwise} \end{cases}$$

where, if the value of $Skin_{color}(x, y)$ is 1, the detected range of the face color is determined as the skin color. The recognition module 160 then sets the color of the detected range as white. If the value of $Skin_{color}(x, y)$ is not 1, the detected range of the face color is determined as being a non-skin color. The recognition module 160 then sets the color of the detected range as black. After defining the face zone, the recognition module 160 defines a face-rectangular representative of a maximal of the face zone. The face-rectangular is a sampling space of characteristics within the face zone which is defined by the recognition module 160 according to the characteristics within the face zone.

The recognition module 160 is further configured to locate an eye area from the defined face zone. Firstly, the recognition module 160 locates a rough eye area by detecting two circle shapes having deeper color than a neighborhood from the defined face zone. After detecting the rough eye area, the recognition module 160 utilizes an algorithm, such as the Sobel algorithm to enhance the border of the eye area and further blacken the eye area. The eye area is then processed by a binarization process. Herein, the binarization process is an image binarizing algorithm based on a mathematical morphology.

After performing the binarization process, the recognition module 160 samples the border of the eye area so as to obtain an outline of the eye area by an algorithm, such as the Snake algorithm. The outline of the eye area is then utilized to define a eye-rectangular representative of a maximal of the eye area, and thus the recognition module 160 may obtain a height (H) and a width (W) of the eye-rectangular.

The analysis module 180 is operable to calculate the ratio of the height and the width of the eye area (H/W), and determine whether the baby is awake. In one embodiment, if the ratio of H/W exceeds the second threshold value, the analysis module 180 determines that the baby is awake. If the ratio of H/W is smaller than the second threshold value, the analysis module 180 determines that the baby is asleep.

The command module 190 is operable to send a communication instruction to the electronic device 3 if the analysis module 180 determines that the baby is awake. The processor 32 installed in the electronic device 3 then executes the communication instruction instructing the electronic device 3 to dial a predefined phone number automatically.

In one embodiment, the electronic device 3 is operable to make a video call if the analysis module 180 determines that the baby is awake.

In one embodiment, the electronic device 3 may operate in an auto-answer mode. After an incoming call is successfully established, the electronic device 3 automatically enters a video-mode, allowing dedicated checking in from an outside location.

In other embodiments, the setup module 100 further sets a time threshold value to prevent the analysis module 180 from continuously analyzing the captured image. The command module 190 sends the communication instruction to the electronic device 3 to dial a predefined warning number automatically if the time utilized by the analysis module 180 exceeds the time threshold value. For example, if the baby is awake and moves to a location outside the target region, the analysis module 180 sends the communication instruction instructing the electronic device 3 to dial the predefined warning number.

Figure 3:
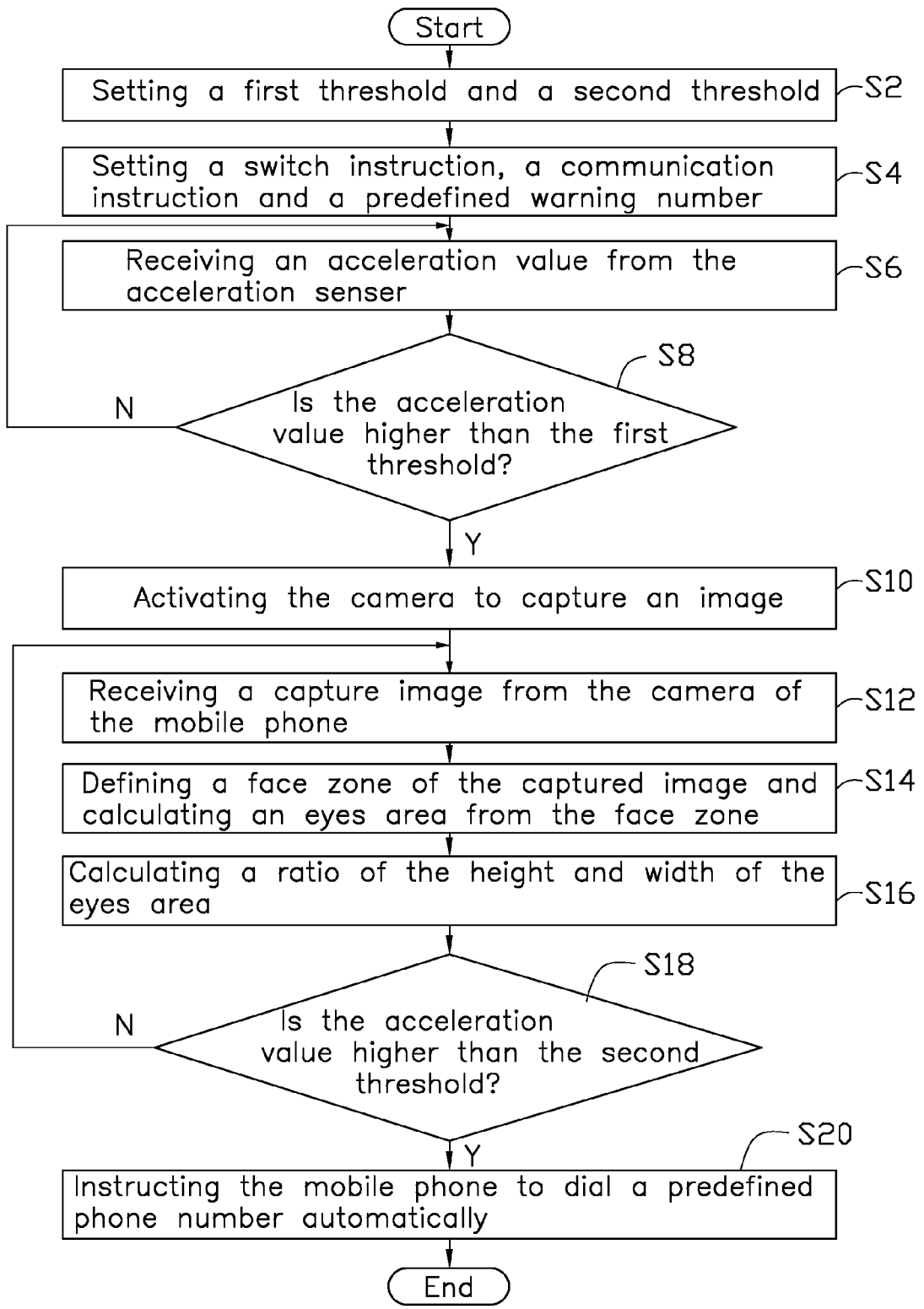
FIG. 3 is a flowchart illustrating one embodiment of a method for site monitoring.

FIG. 3 is a flowchart illustrating one embodiment of a method for site monitoring. Depending on the embodiment, additional blocks in the flow of FIG. 3 can be added, others removed.

In block S2, the setup module 100 sets a first threshold value to detect motion of the crib and a second threshold value to check if the baby is awake.

In block S4, the setup module 100 sets a switch instruction to instruct the camera 34 to capture the image and a predefined warning number for an emergency.

In block S6, the receiving module 120 receives the acceleration value from the acceleration sensor 30 after the site monitoring system 10 is activated.

In block S8, the switch module 140 compares the received acceleration value and the first threshold value. If the received acceleration value exceeds the first threshold value, block S10 is implemented. If not, block S6 is repeated.

In block S10, the switch module 140 sends a switch instruction to the processor 32 of the electronic device 3. Then the camera 34 is instructed to capture an image by the processor 32 of the electronic device 3.

In block S12, the receiving module 120 receives the captured image from the camera 34.

In block S14, the recognition module 160 detects a face zone and locates an eye area from the captured image. The detection of the face zone is accomplished by the skin-color algorithm as described. After defining the face zone, the recognition module 160 defines a face-rectangular representative of a maximal of the face zone. The recognition module 160 then locates a rough eye area by detecting two circle shapes having deeper color than a neighborhood from the defined face zone. The eye area is further processed by the Sobel algorithm and the Snake algorithm so as to define a eye-rectangular representative of a maximal of the eye area.

In block S16, the analysis module 180 calculates a ratio of the height compared the width of the eye area (H/W) based on the face-rectangular representative of a maximal of the face zone and block S18 is implemented.

In block S18, the analysis module 180 determines whether the baby is awake by comparing the ratio of H/W with the second threshold value. For example, if the ratio of H/W exceeds the second threshold value, the analysis module 180 determines that the baby is awake and block S20 is implemented. If not, and the analysis module 180 determines that the baby is asleep and block S12 is repeated to analyze the next received capture.

In block S20, the command module 190 sends a communication instruction to the electronic device 3. The processor 32 executes the communication instruction and instructs the electronic device 3 to dial a predefined warning number automatically.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer in communication with an electronic device positioned in a crib, the electronic device comprising a camera, an acceleration sensor, and a processor, the computer comprising:

a setup module setting a first threshold value to detect motion of the crib and a second threshold value to determine whether the baby is awake;

a receiving module receiving an acceleration value of the motion of the crib from the acceleration sensor;

a switch module sending a switch instruction to instruct the camera to capture an image of the baby if the acceleration value received from the acceleration sensor exceeds the first threshold value;

a recognition module defining a face zone of a captured image from the camera and to locate an eye area in the face zone;

an analysis module calculating a ratio of height and width of the eye area, compare the ratio to the second threshold value, and determine the baby is awake if the ratio of height and width of the eye area exceeds the second threshold value;

a command module instructing the electronic device to dial a predefined warning number automatically upon determining the baby is awake; and at least one processor that executes the setup module, the receiving module, the switch module, the recognition module, the analysis module, and the command module.

2. The computer as claimed in claim 1, wherein the setup module sets a sensitivity level of the acceleration sensor.

3. The computer as claimed in claim 2, wherein the acceleration sensor is a G-sensor.

4. The computer as claimed in claim 1, wherein the recognition module defines the face zone according to a skin-color algorithm, a Sobel algorithm and a Snake algorithm.

5. The computer as claimed in claim 1, wherein the command module sends at least one communication instruction to the electronic device to dial the predefined warning phone number automatically if the recognition module is unable to define the face zone of the captured image.

6. The computer as claimed in claim 1, wherein the analysis module determines the baby is asleep if the calculated ratio is smaller than the second threshold value.

7. A computer-implemented method being executed by a processor of a computer for site monitoring, the computer connected with an electronic device installed in a crib, the electronic device comprising a camera, an acceleration sensor, and a processor, the method comprising:
setting a first threshold value to detect a motion of the crib and setting a second threshold value to determine whether a baby in the crib is awake;
receiving an acceleration value of the motion of the crib from the acceleration sensor;
instructing the camera to capture an image of the baby if the received acceleration value exceeds the first threshold value;
receiving a captured image of the baby from the camera of the electronic device;
detecting a face zone of the captured image and locating an eye area in the face zone;
calculating, by said processor, a ratio of the height and width of the eye area, comparing the ratio to the second threshold value, and determining the baby is awake if the ratio of height and width of the eye area exceeds the second threshold value; and
instructing the electronic device to dial a predefined warning number automatically upon determining the baby is awake.

8. The method as claimed in claim 7, further comprising: setting a sensitivity level of the acceleration sensor.

9. The method as claimed in claim 7, wherein the step of detecting the face zone of the captured image and locating the eye area in the face zone is executed according to a skin-color algorithm, a Sobel algorithm and a Snake algorithm.

10. The method as claimed in claim 7, further comprising:
instructing the electronic device to dial a predefined warning phone number automatically if the analysis module is unable to detect the face zone of the captured image.

11. The method as claimed in claim 7, further comprising:
determining the baby is asleep if the calculated ratio is smaller than the second threshold value.

12. A non-transitory storage medium having stored thereon instructions that, when executed by a processor, cause the processor to perform a method for site monitoring, the method comprising:
set a first threshold value to detect a motion of a crib and setting a second threshold value to determine whether a baby in the crib is awake;
receive an acceleration value of the motion of the crib from an acceleration sensor;
instruct a camera of an electronic device to capture an image of the baby if the received acceleration value exceeds the first threshold value;
receive a captured image of the baby from the camera of the electronic device;
detect a face zone of the captured image and locating an eye area in the face zone;
calculate a ratio of the height and width of the eye area, comparing the ratio to the second threshold value, and determining the baby is awake if the ratio of height and width of the eye area exceeds the second threshold value; and
instruct the electronic device to dial a predefined warning number automatically upon determining the baby is awake.

13. The storage medium of claim 12, wherein the method further comprising:
set a sensitivity level of the acceleration sensor.

14. The storage medium of claim 12, wherein the step of detect the face zone of the captured image and locate the eye area in the face zone is executed according to a skin-color algorithm, a Sobel algorithm and a Snake algorithm.

15. The storage medium of claim 12, wherein the method further comprising:
instruct the electronic device to dial a predefined warning phone number automatically if the analysis module is unable to detect the face zone of the captured image.

16. The storage medium of claim 12, wherein the method further comprising:
determine the baby is asleep if the calculated ratio is smaller than the second threshold value.

\* \* \* \* \*